United States Patent [19]

Lundgren

[11] Patent Number: 4,566,811
[45] Date of Patent: Jan. 28, 1986

[54] DEVICE FOR SEALING A SELF-ALIGNING ROLLING BEARING

[75] Inventor: Bengt Lundgren, Lerum, Sweden

[73] Assignee: SKF Nova AB, Gothenburg, Sweden

[21] Appl. No.: 705,131

[22] Filed: Feb. 25, 1985

[30] Foreign Application Priority Data

Apr. 24, 1984 [SE] Sweden ................................. 8402234

[51] Int. Cl.[4] ............................................. F16C 33/78
[52] U.S. Cl. ..................................... 384/484; 384/147
[58] Field of Search ............... 384/484, 482, 146, 147, 384/148, 140

[56] References Cited

U.S. PATENT DOCUMENTS

| | | | |
|---|---|---|---|
| 3,395,950 | 8/1968 | Brandt | 384/148 |
| 3,947,077 | 3/1976 | Berg et al. | 384/147 |
| 4,054,334 | 10/1977 | McAllis | 384/484 |
| 4,398,775 | 8/1983 | Hofmann et al. | 384/484 |

Primary Examiner—Lenard A. Footland
Attorney, Agent, or Firm—Eugene E. Renz, Jr.

[57] ABSTRACT

A device for sealing a spherical rolling bearing comprises two annular sealing bodies (4, 5) arranged on the respective bearing rings and divided by a gap (6) with spherical opposing surfaces. A further sealing washer (9) is provided in recesses (7, 8) in the sealing bodies (4, 5) and delimits a space (10) in connection to the gap (6). The washer (9) is fixed in one sealing member (4) and is provided with a sealing lip (11) contacting a spherical surface of the other sealing body (5). The device gives a good sealing effect also when the rings of the bearing are skewed in relation to each other.

5 Claims, 1 Drawing Figure

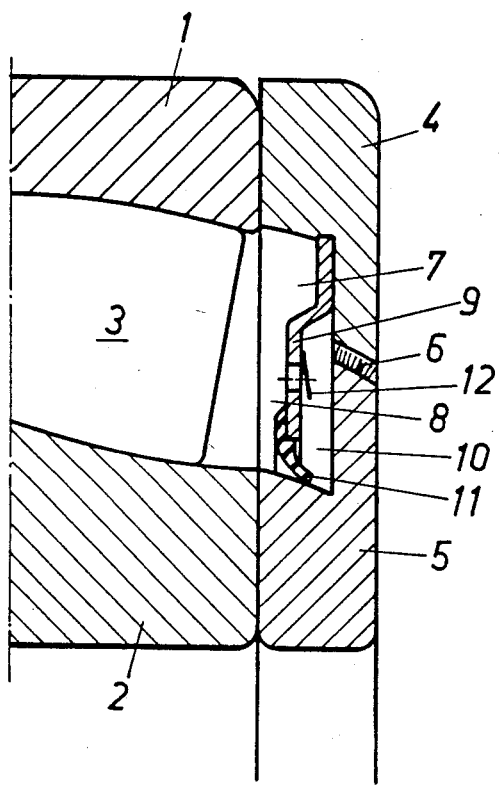

DEVICE FOR SEALING A SELF-ALIGNING ROLLING BEARING

The invention relates to a device of the kind specified in the introduction of claim 1.

Sealing devices for spherical rolling bearings are known, e.g. by the Swedish patent publication No. 7304938-9 with publication number 388,254. FIG. 12 therein shows a sealing device comprising two sheet metal rings which are attached to the respective bearing rings and having spherical portions limiting a sealed gap. Such an arrangement permits the bearing rings to be skewed in relation to each other. When the bearing rings are skewed, the sealing properties are impaired, however, since the width of the gap between the spherical portions of the sheet metal rings is decreased, or the gap opens completely.

The object of the present invention is to provide an improved device for a spherical rolling bearing, and this is achieved by giving the device the characterizing features specified in claim 1.

Such a device has good sealing properties even when the bearing rings are skewed to the limit of what the sealing arrangement permits.

The following is a detailed description of the invention, and reference is made to the accompanying drawing, which shows an axial section of a portion of a rolling bearing, the end plane of which being provided with a sealing device according to an embodiment of the invention.

The bearing is a spherical roller bearing with an outer ring 1, an inner ring 2 and a number of rollers 3 arranged between the rings and rolling along raceways provided on the rings. The rollers are suitably guided and separated by a cage, which is omitted in the drawing for the sake of clarity. The raceway of the outer ring is here concave and spherical in order to admit simultaneous relative rotation and inclination of the outer and the inner ring. Annular sealing bodies 4, 5 are provided on the end faces of the bearing rings 1, 2. These bodies co-operate with each other for sealing off the space between the raceways. The bearing 1, 2, 3 may be sealed at one or both sides by one or two devices according to the invention, although only one side of the bearing is shown in the drawing. The sealing bodies have opposing, mainly spherical surfaces which delimit a sealing gap 6 separating the sealing bodies. One of the surfaces may be provided with a fibrous strip in a manner known per se. The sealing bodies are preferably shaped so that they contact the entire end face of the respective bearing ring, and their outer end faces are suitably flat and extend radially from the bore of the inner ring to the periphery of the outer ring. The sealing bodies are preferably massive in the axial extension between the outer end faces and the faces contacting the bearing rings, in order to provide robust support when the bearing is fastened by e.g. being axially squeezed against a stop on a shaft or in a housing. The sealing bodies may be fastened to the bearing rings in a number of ways, e.g. by glueing or by screws or by magnetic means.

Co-axial annular recesses 7, 8, which connect to each other and form an axial extension of the space between the raceways of the bearing rings, are arranged in the sealing bodies in connection to the gap 6. An annular member 9, suitably a sheet metal washer, is provided in the recesses 7, 8 in order to improve the sealing properties of the device. The member 9 delimits an annular space 10 in the recesses and is fixed to one sealing body 4 and provided with a sealing lip 11 co-operating with a mainly spherical surface on the other sealing body 5. Thereby the sealing bodies arranged on the respective bearing rings are permitted to be skewed in relation to each other, and the sealing lip 11 co-operates with a perfect sealing function with the spherical surface of the sealing body 5 also when skewing occurs and the width of the gap 6 decreases.

The comparatively delicate washer 9 and the sealing lip 11 are effectively protected by the sealing bodies 4, 5 against damages caused by external influence.

The space 10 may suitably be filled with grease in order to prevent ingress of water and other contaminants into the bearing. If the bearing is provided with means for re-lubricating, the member 9 may suitably be provided with a valve 12 opening towards the space 10 from the interior of the bearing when the bearing is re-lubricated, whereby possible contaminated grease in the space 10 is forced out through the gap 6.

The gap 6 is suitably situated radially outside the rim of the lip 11, since the lip, which causes friction, ought to be situated at the smallest possible distance from the center of rotation of the bearing, thereby minimizing friction loss. In order to avoid that all of the grease in the space 10 is subjected to centrifugal force tending to press the grease out through the gap 6, said gap is suitably situated radially inside the outer periphery of the space 10.

What is claimed is:

1. A device for sealing a self-aligning rolling bearing having an outer (1) and an inner (2) ring, one of which having a spherical raceway surface, and a number of rolling bodies (3) arranged between the rings and rolling against raceways provided on the rings, the device comprising annular sealing bodies (4, 5) arranged coaxially on the end surfaces of the respective bearing rings, the bodies co-operating with each other for sealing the space between the raceways and being provided with opposing, mainly spherical surfaces which delimit a gap (6) separating the sealing bodies, characterized in that the sealing bodies are provided with co-axial annular recesses (7, 8) connecting to each other and constituting an axial extension of the space between the raceways in connection to said gap, and that an annular member (9) in said recesses delimits an annular space (10) therein, the member (9) being fixed to one sealing body (4) and provided with a sealing lip (11) co-operating with a mainly spherical surface on the other sealing body (5).

2. A device according to claim 1, in which the gap (6) is situated radially outside the rim of the lip (11) and radially inside the outer periphery of the space (10).

3. A device according to claim 1, in which the annular member (9) is provided with a valve (12) which opens towards the space (10).

4. A device according to claim 1, in which the annular space (10) is filled with lubricating grease.

5. A device according to claim 1, in which the sealing bodies (4, 5) contact the entire end surfaces on the respective bearing rings (1, 2) and have mainly flat outer end surfaces which extend radially from the bore of the inner ring (2) to the periphery of the outer ring (1).

* * * * *